United States Patent [19]
Kinsel et al.

[11] 3,775,252
[45] Nov. 27, 1973

[54] PROCESS FOR CULTIVATING ACETIC ACID-CONTAINING YEASTS

[75] Inventors: Norma A. Kinsel, Pittsburgh; William W. Leathen, Wexford, both of Pa.

[73] Assignee: Gulf Research & Development Company, Pittsburgh, Pa.

[22] Filed: Sept. 17, 1971

[21] Appl. No.: 181,557

[52] U.S. Cl. ..................... 195/30, 195/83, 195/94, 99/96
[51] Int. Cl. ........................................... C12c 11/14
[58] Field of Search ..................... 195/30, 115, 83, 195/94; 99/9

[56] References Cited
OTHER PUBLICATIONS

Ogata et al., Agr. Biol. Chem., Vol. 33, pp. 977–978, 1969.

Ogata et al., Chem. Abs., Vol. 73, No. 119179n, 1970.

*Primary Examiner*—Alvin E. Tanenholtz
*Attorney*—Meyer Neishloss et al.

[57] ABSTRACT

A process for cultivating an acetic acid-consuming yeast includes the following steps:

1. An acetic acid-consuming yeast is added to a growth-supporting mixture of aqueous nutrient medium, acetic acid at a low concentration level and gas containing free oxygen.

2. Aerobic culturing of the yeast is initiated with no noticeable stationary growth stage by incrementally introducing small amounts of acetic acid into the fermentation mass either continuously or intermittently throughout the growth period of the micro-organism.

14 Claims, No Drawings

PROCESS FOR CULTIVATING ACETIC ACID-CONTAINING YEASTS

This invention relates to a process for cultivating yeasts utilizing a substrate containing acetic acid as a sole source of carbon to promote growth and more particularly to a process wherein propagation of the acetic acid consuming-yeasts is conducted under conditions substantially to eliminate the initial stationary phase normally encountered in the characteristic growth pattern of micro-organisms such as yeasts.

Critical food shortages for both animals and humans in some parts of the world is a problem of growing concern. The use of fertilizers and improved farming techniques have greatly increased crop return per acre of cultivated ground. While increased crop yields has resulted in more food for more people throughout the world, there are still an alarming number of people who are suffering from malnutrition. To alleviate malnutrition, protein and vitamin food supplements have been developed for both animal and human consumption. Protein concentrates for food supplements that are commercially available include fish meal, peanut meal, cottonseed meal, soybean meal and micro-organisms such as bacteria, molds, yeasts and the like.

Micro-organisms, because of their high rate of multiplication, have received much attention as a source of high quality protein. The ability of micro-organisms to metabolize carbohydrates is well-known. It is equally well-known, however, that carbohydrates are relatively expensive raw materials if the desired end product is a relatively inexpensive micro-organism. Because of the abundance of relatively inexpensive crude oil deposits, a considerable amount of experimental work has been conducted utilizing hydrocarbons derived from petroleum as the sole source of carbon for the growth of micro-organisms. A number of micro-organisms have been found to grow on petroleum substrates varying from normally gaseous hydrocarbons through normally liquid hydrocarbons and hydrocarbons that are solid under normal atmospheric conditions.

While hydrocarbons derived from petroleum have been successfully utilized in supporting the growth of some micro-organisms, particularly yeasts and bacteria, some difficulty has been experienced in obtaining a protein product which is completely free from residual hydrocarbons. Various procedures have been developed for obtaining a hydrocarbon-grown protein product which is free from hydrocarbons but such procedures have adversely affected the economics of the overall process.

It is known that some micro-organisms particularly bacteria such as *Brevibacterium roseum*, *Brevibacterium flavum*, *Brevibacterium lactofermentus*, *Corynebacterium acetoacidophilum* and *Corynebacterium acetoglutanicum* have utilized some organic acids such as citric acid, acetic acid, lactic acid and the like in substrates as the carbon source in the fermentative production of L-glutamic acid. These organic acids because of their ready solubility in water cause no problem of contamination in recovering fermentation products free from such acids.

While acetic acid has been used as a source of carbon in the fermentation of certain bacteria, acetic acid has not been used as a carbon source in cultivating yeasts because of the low product yields obtained due to the inhibitory-growth effect which acetic acid has on yeasts. In some instances, acetic acid is known to have completely killed yeasts.

As indicated above, one of the problems which heretofore has been encountered in cultivating yeasts on an acetic acid-containing substrate is the inhibitory-growth effect which acetic acid has on the yeasts. The poor initial growth response encountered with yeasts cultured on acetic acid, at least in part, is due to the initial stationary phase normally associated with the growth of all micro-organisms. During the initial stationary phase, the number of micro-organisms remains constant. In order for a fermentation process to be economically attractive, it is desirable, among other things, to obtain a high concentration of micro-organism cells as soon as possible after initiation of the propagation. Thus, it is desirable to initiate the growth of micro-organisms under conditions such that the initial stationary phase is either eliminated or the time in which the phase is encountered greatly reduced.

Typically, micro-organisms grow in the fermentation period in a characteristic growth pattern which may be designated as follows:

1. Initial stationary phase — In this phase, the number of micro-organisms remains constant.
2. Lag phase — During this period, the rate of multiplication increases with time.
3. Logarithmic growth phase — The rate of multiplication remains constant; the generation time is the same throughout the period.
4. Negative growth phase — During this phase, the rate of multiplication decreases and the average generation time increases. The organisms continue to increase in number, but at a slower rate than during the logarithmic phase.
5. Maximum stationary phase — The number of living organisms remains constant, i.e., the death rate equals the rate of reproduction.
6. Accelerated death phase — The number of micro-organisms declines with increasing rapidity. The average rate of death increases to a maximum.
7. Logarithmic death phase — In this period, the rate of death is constant.

In accordance with the prsent invention, a process is provided for cultivating an acetic acid-consuming yeast wherein the propagation of the yeast is initiated under conditions such that the initial stationary phase during which time the number of yeast cells remains constant is greatly reduced or eliminated.

We have found that the growth of yeast which is cultivated at an active fermentation temperature in the presence of an aqueous nutrient medium, acetic acid and a gas containing free oxygen can be initiated with a reduced or no noticeable initial stationary phase only if the acetic acid is present at a low concentration level. According to the present invention, an acetic acid-consuming yeast is introduced at a low cell concentration at an active fermentation temperature at about 20° to about 35° C. into a yeast growth-supporting mixture comprising an aqueous nutrient medium, acetic acid, a nitrogen source material and a gas containing free oxygen. Thereafter, the yeast is cultivated in the presence of the growth-supporting mixture while additional small amounts of acetic acid and nitrogen source material are incrementally introduced into the fermentation mass either continuously or intermittently throughout a substantial part of the growth period. The amount of the acetic acid and the nitrogen source material introduced at any given time is such that the total amount of acetic acid and nitrogen present in the fermentation mass at said time is the optimum amount for achieving, at said time, the maximum rate of growth. The acetic acid and the nitrogen source material are added to the fermentation mass in increasing amounts so that the amount of acetic acid and nitrogen added are about equal to the amount of acetic acid and nitrogen consumed by the yeast at any given time. If a large amount of either acetic acid or the nitrogen source material is present at the start of the propagation, the normal initial stationary phase is not substantially reduced.

The acetic acid which is used in the process of the invention can be either chemically pure acetic acid or commercially available acetic acid, the latter being more economically desirable. In initiating the propagation of the yeast in accordance with the process of the invention, a small amount of the acetic acid is added to the nutrient medium. While the amount of acetic acid added initially, particularly the maximum amount, may vary slightly depending upon the particular strain of yeast, we have found that an initial acetic acid concentration of about 0.05 to about 0.5, preferably about 0.05 to about 0.3 percent by volume based on the volume of the fermentation mass (brew) containing about 0.2 to about 3 grams of seed yeast (dry) per liter of fermentation mass is sufficient for optimal growth. After propagation of the yeast has been initiated, additional acetic acid is added continuously or intermittently to the fermentation mass in an amount sufficient to maintain a reserve acetic acid concentration in the fermentation mass of about 0.05 to about 0.5, preferably about 0.05 to about 0.3 percent by volume of the fermentation mass. The acetic acid can be added either continuously at apprxoimately an exponentially increasing rate or intermittently using approximately exponentially increasing quantities. In any event, the acetic acid is added at a rate about equal to the rate at which it is assimilated by the yeast while simultaneously maintaining a reserve acetic acid concentration in the fermentation mass within the range of about 0.05 to about 0.5 percent (volume/volume). For economic reasons, it is desirable to use the least amount of acetic acid necessary to initiate and maintain propagation of the yeast thereon. If concentrations of acetic acid above about 0.5 percent by volume based on the volume of fermantation mass containing about 0.2 to about 3 grams of seed yeast (dry) i.e., *Pichia membranaefaciens* (CS-190-1) (ATCC 20340), per liter of fermentation mass are utilized, there is an undesirable initial stationary phase noted in the propagation. If the seed yeast is *Pichia membranaefaciens* (ATCC 20101), the maximum acetic acid concentration to avoid an undesirable initial stationary phase in the propagation is about 0.3 percent (v/v). If more than 0.6 percent (v/v) of acetic acid is employed with *Pichia membranaefaciens* (CS-190-1) (ATCC 20340) and if more than 0.4 percent (v/v) of acetic acid is employed with *Pichia membranaefaciens* (ATCC 20101), not only is there an undesirable lag in the propagation but also there is a substantial decrease in yield. For this reason, we prefer to use a small amount of acetic acid which is sufficient to initiate propagation of the yeast without any noticeable lag and which is insufficient to result in decreased yields. Thus, the maximum amount of acetic acid employed may vary from 0.3 percent with *Pichia membranaefaciens* (ATCC 20101) to 0.5 percent with *Pichia membranaefaciens* (CS-190-1) (ATCC 20340). We have obtained optimum yields when the acetic acid is within the range of about 0.1 to about 0.3 percent (v/v). We have noted that the grams of yeast (dry) grown per gram of acetic acid used in the process of the invention is virtually independent of the seeding rate.

Yeasts which can be cultivated in the process of the invention are those which normally can assimilate carbon from acetic acid or those which have been adapted to assimilate carbon from acetic acid including those of the family Cryptococcaceae and especially of the sub-family Cryptococcoideae. Other yeasts which can be employed are those of the family Saccharomycetaceae and especially of the sub-family Saccharomycetoideae. A preferred genera of the Cryptoccoideae sub-family is *Candida*. A preferred species of the *Candida* genera is *Candida valida*. A preferred genera of the Saccharomycetoideae sub-family is Pichia. A preferred species of the *Pichia* genera is *Pichia membranaefaciens*. Of these yeasts, a strain of *Pichia membranaefaciens* is preferred, particularly *Pichia membranaefaciens*, strain CS-190-1 which has been isolated from soil in which purple grapes are growing. *Pichia membranaefaciens*, strain CS-190-1 has been made permanently available by depositing a culture thereof in the American Type Culture Collection in Rockville, Md. This strain has been assigned the ATCC number 20340.

The taxonomic description of *Pichia membranaefaciens* CS-190-1 (ATCC 20340) is as follows:

| Characteristics | Pichia membranaefaciens CS-190-1 ATCC 20340 |
|---|---|
| Growth Temperature Response: | |
| 30°C. | Growth |
| 37°C. | Growth |
| Growth on Malt Extract: | Thin, creeping film, slowly formed. |
| Cell Size: | $(2.3–4.5) \times (3.3–6.0)\mu$ |
| Reproduction: | Budding; Rudimentary pseudomycelium; Ascospores; Four, hat-shaped spores per ascus; Asci formed of diploid cells or after conjugation of haploid cells. |
| Sugar Fermentation: | Strictly oxidative; No sugar fermentation. |
| Assimilation of Carbon Compounds: | |
| Glucose | + |
| Lactose | − |
| Maltose | − |
| Sucrose | − |
| Galactose | − |
| Ethanol | + |
| L-sorbose | + |
| Glycerol | +(latently) |
| Lactic Acid | + |
| Succinic Acid | + |
| Cellobiose | − |
| Trehalose | − |
| Melibiose | − |
| Raffinose | − |
| Melezitose | − |
| Inulin | − |
| Soluble Starch | − |
| D-xylose | − |
| L-arabinose | − |
| D-arabinose | − |
| D-ribose | − |
| L-rhamnose | − |
| Erythritol | − |
| Adonitol | − |
| Dulcitol | − |
| Mannitol | − |
| Sorbitol | − |
| alpha-Methyl-D-glucoside | − |
| Salicin | − |
| Glucono- $\sigma$ -lactone | − |
| 2-Keto-gluconate | − |
| 5-Keto-gluconate | − |
| Citric Acid | − |
| Myo-inositol | − |
| Assimilation of Nitrogen Compounds: | |
| Nitrate | − |

| | |
|---|---|
| Peptone | + |
| Ammonium sulfate | + |
| Growth in Vitamin-free Medium: | − |
| Vitamins Required: | Biotin |

*+=Assimilated; −=Not Assimilated*

Inasmuch as micro-organisms such as yeasts are made up of living cells, their growth, as is true with other living organisms, depends upon an adequate supply of carbon, hydrogen, oxygen, nitrogen, phosphorus, sulfur and trace amounts of other elements including calcium, potassium, magnesium and iron. Carbon is required for growth and energy. Nitrogen is required for synthesis of protein and other nitrogenous materials. Other elements are required for mineral structure of the cell. In the present process, carbon, hydrogen and some of the oxygen are supplied by the acetic acid; additional oxygen is supplied from the aqueous substrate and from the air, the micro-organism being an aerobe; and nitrogen is supplied through the use of ammonium or other nitrogenous inorganic salts. Trace quantities of other elements necessary for growth of the yeast may be supplied as impurities in the inorganic salts or these elements may be added directly in extremely small amounts. Frequently, sufficient quantities of the trace elements are present in tap water.

Oxygen, as disclosed hereinabove, is one of the essential elements required to promote the growth of a micro-organism. While pure oxygen can be employed, we prefer for economic reasons to supply the oxygen as air. In order to effect an optimum growth of the micro-organism, the air should be finely dispersed through the substrate preferably with agitation at a rate sufficient to form a vortex in the liquid. Depending upon the design of the fermentor, various air introducing means can be used including single orifice, half and full ring types with openings for air discharge directed upwardly and/or downwardly, and sintered glass percolator types with various impellers for lifting air. Impellers, when employed, can be rotated at rates from 40 to 1,000 rpm or more, the particular rate being chosen to create vortex in the liquid. Regardless of the type of air introduction means employed, opertion should be such as to avoid excessive foaming since foaming tends to entrap the micro-organism and remove it from the source of soluble nutrients required in its growth. While the amount of air employed depends somewhat on the size and design of the fermentor, good results are obtained in 14-liter fermentors containing 7 liters of brew when employing sterile air at rates of 2 to 10 liters per minute.

The nitrogenous materials which can be used in the process of the invention to supply nitrogen are those compounds of nitrogen which are readily soluble in water including, by way of example, the ammonium phosphates, ammonium chloride, ammonium nitrate, ammonium hydroxide, ammonium sulfate and the like. In initiating the propagation of the yeast in accordance with the process of the invention, a small amount of the nitrogen source material is added initially either by means of a nitrogenous material in the nutrient medium or by separate addition of a nitrogenous material to the nutrient medium. While the amount of the nitrogen source material added initially may vary from one material to another depending upon its nitrogen content, we have found that an initial nitrogen concentration of about 30 to about 200 mg of nitrogen per liter of fermentation mass containing about 0.2 to about 3 grams of seed yeast (dry) per liter of fermentation mass is sufficient for optimal growth. After propagation of the yeast has been initiated, additional nitrogen source material is added continuously or intermittently to the fermentation mass in an amount sufficient to maintain a reserve nitrogen concentration in the fermentation mass of about 30 to about 200 mg of nitrogen per liter of fermentation mass. The nitrogen source material can be added either continuously at approximately an exponentially increasing rate or intermittently using approximately exponentially increasing quantities. In any event, the nitrogen source material is added at a rate about equal to the rate at which it is consumed by the yeast while simultaneously maintaining a reserve nitrogen concentration in the fermentation mass of about 30 to about 200 mg of nitrogen per liter of fermentation mass. For economic reasons, it is desirable to use the least amount of nitrogenous material necessary to initiate and maintain propagation of the yeast.

Adequate growth of a micro-organism such as yeast requires not only a source of readily available carbon, hydrogen, oxygen and nitrogen but also the presence of an aqueous medium containing other nutrients. The make-up of the aqueous nutrient medium which we employ can vary to some extent depending upon the particular yeast which is used. In general, the nutrient medium comprises a mixture of mineral salts which furnish ions of nitrate or nitrite, potassium, ferrous or ferric, calcium, magnesium, phosphate, sulfate, as well as ions of trace elements including zinc, manganese, copper and molybdenum. Ammonium ions to supply nitrogen have previously been mentioned and are present in the aqueous nutrient medium in small amounts required to give the nitrogen concentration defined hereinabove. Inasmuch as water is included in the nutrient mixture, many of the mineral salts can be incorporated into the substrate in sufficient quantity through the use of tap water. It is desirable, however, to add the salts to the mixture to insure their presence in sufficient quantity for growth of the yeast. The nutrient mixture consists primarily of water, which may constitute about 50 to 99 percent by weight or more of the total nutrient mixture. Generally, the water is employed in an amount normally used in microbial synthesis. A typical mineral salts medium for the growth of yeasts of the genus *Pichia*, for example *Pichia membranaefaciens*, in the process of the invention has the following composition:

| | |
|---|---|
| Potassium dihydrogen phosphate, $KH_2PO_4$ | 2.0 g. |
| Magnesium sulfate, $MgSO_4 \cdot 7H_2O$ | 1.0 g. |
| Sodium chloride, NaCl | 0.2 g. |
| Calcium chloride, $CaCl_2 \cdot 2H_2O$ | 0.2 g. |
| D-biotin | 5 μg. |
| Boric acid, $H_3BO_3$ | 1000 μg. |
| Copper sulfate, $CuSO_4 \cdot 5H_2O$ | 80 μg. |
| Potassium iodide, KI | 200 μg. |
| Ferric chloride, $FeCl_3 \cdot 6H_2O$ | 400 μg. |
| Manganese sulfate, $MnSO_4 \cdot H_2O$ | 800 μg. |
| Sodium molybdate, $Na_2MoO_4 \cdot 2H_2O$ | 400 μg. |
| Zinc sulfate, $ZnSO_4 \cdot 7H_2O$ | 800 μg. |
| Distilled water, sufficient to form 1 liter of solution | |

Prior to use in the process of the invention, ammonium sulfate $[(NH_4)_2SO_4]$ is added to the nutrient medium to give a nitrogen concentration of about 30 to about 200 mg per liter of nutrient medium.

Another typical mineral salts medium which can be used as a nutrient in the process of the invention has the following composition:

| | |
|---|---|
| Potassium dihydrogen phosphate, $KH_2PO_4$ | 1.3 g. |
| Magnesium sulfate, $MgSO_4 \cdot 7H_2O$ | 0.2 g. |

| | |
|---|---|
| Calcium chloride, $CaCl_2 \cdot 2H_2O$ | 0.02 g. |
| Ferric chloride, $FeCl_3 \cdot 6H_2O$ | trace |
| yeast extract | 1.0 g. |
| Distilled water, sufficient to form 1 liter of solution | |

Prior to use in the process of the invention, diammonium hydrogen phosphate [$(NH_4)_2HPO_4$] is added to the nutrient medium to give a nitrogen concentration of about 30 to about 200 mg per liter of nutrient medium.

In growing an acetic acid-consuming yeast on a substrate to which acetic acid and ammonium salts are added, there is a tendency for the pH of the aqueous nutrient medium to drop, i.e., become more acidic. Thus, to prevent a buildup of acidity which adversely affects the growth of the yeast, it is essential to add an alkaline material to restore the pH of the aqueous nutrient medium to a desired level. If the pH is not maintained at a desired level, the growth of the yeast ceases, that is cellular density no longer increases so that a stationary growth phase is encountered.

The optimum pH of the aqueous nutrient medium depends somewhat upon the nature of the substrate and the particular yeast being cultured. The pH is usually within the range of about 1.5 to about 8. With mineral salts substrates, the optimum pH for most yeast cultures is a pH of about 5. When employing a yeast nitrogen base substrate, optimum growth for a yeast of the genus *Candida* and *Pichia*, for example, *Candida valida* and *Pichia membranaefaciens* occurs at a pH of about 2 to 5, a pH of about 3.5 being preferred. In order to maintain the pH at any desired level, we may add to the aqueous nutrient medium any suitable alkaline material such as sodium hydroxide, potassium hydroxide, disodium hydrogen phosphate, ammonium hydroxide and ammonia.

The optimum temperature for the growth of the yeast is within the range of about 20° to about 35° C. When using a strain of *Candida valida* or *Pichia membranaefaciens* the preferred temperature range is about 25° to about 35° C.

In order to illustrate the improved results obtained in accordance with the process of the invention, comparative examples are set forth hereinafter. In Examples I to VI and X to XII, the acetic acid concentration in the brew is maintained within the range of about 0.05 to about 0.5 percent (v/v). In Examples VII to IX and XIII to XV the acetic acid concentration in the brew is maintained within the range of about 0.5 to about 1.0 percent (v/v).

In the comparative examples, we have utilized *Pichia membranaefaciens*, strain CS-190-1 (ATCC 20340) in Examples I to IX and *Pichia membranaefaciens* (ATCC 20101) in Examples X to XV. The *Pichia membranaefaciens* (ATCC 20340) was isolated through an enrichment culture procedure from soil in which grapes were growing in Western Pennsylvania. The yeast was characterized and identified in accordance with the classification in "The Yeasts" by J. Lodder and N. J. W. Kreger-Van Rij, North Holland Publishing Co., Amsterdam, 1952. The yeast *Pichia membranaefaciens* (CS-190-1) (ATCC 20340), was found to be identical in all physiological characteristics with *Pichia membranaefaciens* (ATCC 20101) obtained from the American Type Culture Collection, Rockville, Md. Morphologically, *Pichia membranaefaciens* (CS-190-1) (ATCC 20340) was similar to *Pichia membranaefaciens* (ATCC 20101), differing primarily in cell size. The cells of the strain of *Pichia membranaefaciens* (CS-190-1) (ATCC 20340) were slightly smaller than the cells in *Pichia membranaefaciens* (ATCC 20101). The cells in *Pichia membranaefaciens* (CS-190-1), on the average measured $6.6\mu \times 4.5\mu$. The cells in *Pichia membranaefaciens* (ATCC 20101), on the average measured $7.1 \mu \times 4.9\mu$.

EXAMPLE I

Seven liters of an aqueous mineral nutrient medium are introduced into a 14-liter Pyrex glass fermentor jar equipped with a stainless steel head assembly. The head assembly contains ports for the addition of nutrients and removal of samples, an agitator shaft, an air sparger line, baffles and a thermometer well. The aqueous nutrient medium introduced into the fermentor has the following composition based on one liter of solution:

| | |
|---|---|
| Potassium dihydrogen phosphate, $KH_2PO_4$ | 2.0 g. |
| Magnesium sulfate, $MgSO_4 \cdot 7H_2O$ | 1.0 g. |
| Sodium chloride, NaCl | 0.2 g. |
| Calcium chloride, $CaCl_2 \cdot 2H_2O$ | 0.2 g. |
| D-biotin | 4µg. |
| Calcium pantothenate | 800µg. |
| Folic acid | 4µg. |
| Inositol | 4000µg. |
| Niacin | 800µg. |
| p-aminobenzoic acid | 400µg. |
| Pyridoxine hydrochloride | 800µg. |
| Riboflavin | 400µg. |
| Thiamine hydrochloride | 800µg. |
| Boric acid, $H_3BO_3$ | 1000µg. |
| Copper sulfate, $CuSO_4 \cdot 5H_2O$ | 80µg. |
| Potassium iodide, KI | 200µg. |
| Ferric chloride, $FeCl_3 \cdot 6H_2O$ | 400µg. |
| Manganese sulfate, $MnSO_4 \cdot H_2O$ | 800µg. |
| Sodium molybdate, $Na_2MoO_4 \cdot 2H_2O$ | 400µg. |
| Zinc sulfate, $ZnSO_4 \cdot 7H_2O$ | 800µg. |
| Distilled water — Sufficient to form 1 liter of solution | |

The fermentor is placed in a water bath which is adjusted to maintain the fermentation medium at 28° to 30° C. The fermentor is equipped with impellers connected to a drive mechanism capable of rotating the impellers at rates up to 1,000 rpm. The air which is introduced into the fermentor through the sparger is passed through a stainless steel filter tube packed with Pyrex glass wool to remove any particles of dust as well as any air-borne micro-organisms.

Prior to the start of assimilation, 4.62 g. of ammonium sulfate and 7.0 ml of acetic acid feedstock which contains 0.533 g. of acetic acid per ml are added to the fermentor which contains the seven liters of nutrient medium. The concentration of acetic acid in the fermentor is thus about 0.05 percent by volume or 50 µl acetic acid per 100 ml of nutrient medium. The concentration of nitrogen based on 4.62 g. of ammonium sulfate per 7 liters of nutrient medium is about 140 mg. of nitrogen per liter of nutrient medium. 4.7 grams of dry yeast of the strain *Pichia membranaefaciens* (CS-190-1) (ATCC 20340) is introduced as inoculant into the fermentor. The cellular density of the yeast in the fermentor is thus about 0.67 g. per liter.

Propagation is conducted for 8 hours at 28° to 30° C. with an aeration rate of about 5 liters per minute at impeller speeds of 500 to 700 rpm. During this 8-hour period a total of 54.4 ml of the acetic acid feedstock (0.533 g. acetic acid/ml.) and 17.2 ml. of the nitrogen source material is added at hourly intervals in increasing increments. The acetic acid is added to maintain the concentration level at about 0.05 percent, i.e., 50 µl of acetic acid per 100 ml of brew over the 8-hour period. Acetic acid concentration levels are determined hourly by gas liquid chromatography (GLC). Aqueous solutions of ammonium sulfate and ammonium hydroxide are added to supply nitrogen and to maintain the pH of the fermentation mass within the range of about 3.0 to about 3.5. The acetic acid feedstock and the nitrogen source material are added at the beginning of each hour in amounts appropriate for the anticipated yeast growth. Thus, the concentration of these materials at any given time may vary slightly from the amount actually required. The pH, formalin number and acetic acid concentration are determined at the end of each hour. At the end of the 8-hour fermentation period the cellular density is about 15.5 g. of dry matter per seven liters, or about 2.2 g. per liter.

A summary of the experimental data and the results obtained in Example I are shown in Table I.

TABLE I.—SUMMARY OF EXAMPLE I

| | pH [1] | Formalin No. (mg. N/l.) [1] | Nitrogen source additions, ml.[2] | Acetic acid feedstock additions, ml.[2][3] | Acetic acid conc. level found, μl./100 ml.[1] | Volume, ml. | Total yeast (dry) in brew, g. |
|---|---|---|---|---|---|---|---|
| Time, hrs.: | | | | | | | |
| 0 [4] | 3.5 | 0.94 (131.6) | 0.0 | 0.0 | 55 | 7,000.0 | 4.7 |
| 1 | 3.5 | 0.94 (131.6) | [5] 0.9 | 2.9 | 60 | 7,003.8 | 5.2 |
| 2 | 3.3 | 0.94 (131.6) | [5] 1.0 | 3.2 | | 7,008.0 | 5.8 |
| 3 | 3.3 | 0.94 (131.6) | [6] 1.2 | 3.7 | 45 | 7,012.9 | 6.6 |
| 4 | 3.3 | 0.93 (130.2) | [6] 1.3 | 4.0 | 48 | 7,018.2 | 7.5 |
| 5 | 3.3 | 0.95 (133.0) | [6] 2.4 | 7.5 | 55 | 7,028.1 | 8.8 |
| 6 | 3.3 | 0.95 (133.0) | [6] 2.9 | 9.1 | | 7,040.1 | 10.7 |
| 7 | 3.3 | 0.95 (133.0) | [6] 3.4 | 10.9 | 60 | 7,054.4 | 12.9 |
| 8 | 3.3 | 0.95 (133.0) | [6] 4.1 | 13.1 | 45 | 7,071.6 | 15.5 |
| Total | | | 17.2 | [7] 54.4 | | | |

[1] Determination made at the end of each hour.
[2] Feed additions are made at the beginning of each hour.
[3] The feedstock acetic acid contains 0.533 g. acetic acid/ml.
[4] Conditions at start: 4.7 g. of seed yeast; 7–L of nutrient medium; 4.62 g. of $(NH_4)_2SO_4$; and 7.0 ml. (3.7 g.) of feedstock acetic acid (0.50% acetic acid or 50 μl. acetic acid/100 ml.).
[5] As $(NH_4)_2SO_4$ solution containing 49.00 mg. N/ml.
[6] As $NH_4OH$ solution containing 52.50 mg. N/ml.
[7] 29.0 g.

It will be noted from the data in Table I that the total yeast in the brew increased from 4.7 to 15.5 grams, an increase of 10.8 grams (69.7 percent yield/8 hrs.) and that propagation was initiated without noticeable lag.

EXAMPLE II

The procedure of Example I is repeated using *Pichia membranaefaciens* (CS-1-190) (ATCC 20340) as the seed yeast except that an acetic acid concentration of 0.1 percent is used. A summary of the experimental data and the results obtained in Example II are shown in Table II.

TABLE II.—SUMMARY OF EXAMPLE II

| | pH [1] | Formalin No. (mg. N/l.) [1] | Nitrogen source additions, ml.[2] | Acetic acid feedstock additions, ml.[2][3] | Acetic acid conc. level found, μl./100 ml.[1] | Volume, ml. | Total yeast (dry) in brew, g. |
|---|---|---|---|---|---|---|---|
| Time, hrs.: | | | | | | | |
| 0 [4] | 3.4 | 0.93 (130.2) | 0.0 | 0.0 | 115 | 7,000.0 | 4.7 |
| 1 | 3.4 | 0.93 (130.2) | [5] 0.9 | 2.9 | 62 | 7,003.8 | 5.2 |
| 2 | 3.3 | 0.93 (130.2) | [5] 1.0 | 3.2 | | 7,008.0 | 5.8 |
| 3 | 3.3 | 0.93 (130.2) | [6] 1.2 | 3.7 | 72 | 7,012.9 | 6.6 |
| 4 | 3.2 | 0.91 (127.4) | [6] 1.3 | 4.0 | 80 | 7,018.2 | 7.7 |
| 5 | 3.2 | 0.91 (127.4) | [6] 2.4 | 7.5 | 80 | 7,028.1 | 9.2 |
| 6 | 3.2 | 0.88 (123.2) | [6] 2.9 | 9.1 | | 7,040.1 | 11.4 |
| 7 | 3.2 | 0.92 (128.8) | [6] 4.4 | 14.1 | 78 | 7,058.6 | 13.7 |
| 8 | 3.2 | 0.87 (121.8) | [6] 4.1 | 13.1 | 55 | 7,075.8 | 16.9 |
| Total | | | 18.2 | [7] 57.6 | | | |

[1] Determination made at the end of each hour.
[2] Feed additions are made at the beginning of each hour.
[3] The feedstock acetic acid contains 0.533 g. acetic acid/ml.
[4] Conditions at start: 4.7 g. of seed yeast; 7–L of nutrient medium; 4.62 g. of $(NH_4)_2SO_4$; and 14.0 ml. (7.5 g.) of feedstock acetic acid (0.1% acetic acid or 100 μl. acetic acid/100 ml.).
[5] As $(NH_4)_2SO_4$ solution containing 49.00 mg. N/ml.
[6] As $NH_4OH$ solution containing 52.50 mg. N/ml.
[7] 30.7 g.

It will be noted from the data in Table II that the total yeast in the brew increased from 4.7 to 16.9 grams, an increase of 12.2 grams (72.2 percent yield/8 hrs.) and that propagation was initiated without noticeable lag.

EXAMPLE III

The procedure of Example I is repeated using *Pichia membranaefaciens* (CS-190-1) (ATCC 20340) as the seed yeast except that an acetic acid concentration of 0.2 percent is used. A summary of the experimental data and the results obtained in Example III are shown in Table III.

TABLE III.—SUMMARY OF EXAMPLE III

| | pH [1] | Formalin No. (mg. N/l.) [1] | Nitrogen source additions, ml.[2] | Acetic acid feedstock additions, ml.[2][3] | Acetic acid conc. level found, μl./100 ml.[1] | Volume, ml. | Total yeast (dry) in brew, g. |
|---|---|---|---|---|---|---|---|
| Time, hrs.: | | | | | | | |
| 0 [4] | 3.3 | 0.93 (130.2) | 0.0 | 0.0 | 220 | 7,000.0 | 4.7 |
| 1 | 3.2 | 0.93 (130.2) | [5] 0.9 | 2.9 | 230 | 7,003.8 | 5.2 |
| 2 | 3.2 | 0.93 (130.2) | [5] 1.0 | 3.2 | | 7,008.0 | 5.8 |
| 3 | 3.2 | 0.93 (130.2) | [6] 1.2 | 3.7 | 182 | 7,012.9 | 5.6 |
| 4 | 3.2 | 0.93 (130.2) | [6] 1.3 | 4.0 | 195 | 7,018.2 | 7.3 |
| 5 | 3.2 | 0.90 (126.0) | [6] 2.4 | 7.5 | 228 | 7,028.1 | 9.0 |
| 6 | 3.2 | 0.89 (124.6) | [6] 2.9 | 9.1 | | 7,040.1 | 10.8 |
| 7 | 3.2 | 0.90 (126.0) | [6] 4.4 | 14.1 | 125 | 7,058.6 | 13.3 |
| 8 | 3.2 | 0.89 (124.6) | [6] 4.7 | 15.0 | 165 | 7,078.3 | 16.2 |
| Total | | | 18.8 | [7] 50.5 | | | |

[1] The feedstock acetic acid contains 0.533 g. acetic acid/ml.
[2] Feed additions are made at the beginning of each hour.
[3] Determination made at the end of each hour.
[4] Conditions at start: 4.7 g. of seed yeast; 7–L of nutrient medium; 4.62 g. of $(NH_4)_2SO_4$; and 28.0 ml. (14.9 g.) of feedstock acetic acid (0.2% acetic acid or 200 μl. acetic acid/100 ml.).
[5] As $(NH_4)_2SO_4$ solution containing 49.00 mg. N/ml.
[6] As $NH_4OH$ solution containing 52.50 mg. N/ml.
[7] 31.7 g.

It will be noted from the data in Table III that the total yeast in the brew increased from 4.7 to 16.2 grams, an increase of 11.5 grams (71.0 percent yield/8 hrs.) and that propagation was initiated without noticeable lag.

EXAMPLE IV

The procedure of Example I is repeated using *Pichia membranaefaciens* (CS-190-1) (ATCC 20340) as the seed yeast except that an acetic acid concentration of 0.3 percent is used. A summary of the experimental data and the results obtained in Example IV are shown in Table IV.

EXAMPLE V

The procedure of Example I is repeated using *Pichia membranaefaciens* (CS-190-1) (ATCC 20340) as the seed yeast except that an acetic acid concentration of 0.4 percent is used. A summary of the experimental data and the results obtained in Example V are shown in Table V.

TABLE V.—SUMMARY OF EXAMPLE V

| | pH [1] | Formalin No. (mg. N/l.) [1] | Nitrogen source additions, ml. [2] | Acetic acid feedstock additions, ml. [2] [3] | Acetic acid conc. level found, µl./100 ml. [1] | Volume, ml. | Total yeast (dry) in brew, g. |
|---|---|---|---|---|---|---|---|
| Time, hrs.: | | | | | | | |
| 0 [4] | 3.1 | 0.94 (131.6) | 0.0 | 0.0 | 470 | 7,000.0 | 4.7 |
| 1 | 3.1 | 0.94 (131.6) | [5] 0.9 | 2.9 | | 7,003.8 | 5.2 |
| 2 | 3.1 | 0.96 (134.4) | [6] 1.0 | 3.2 | 350 | 7,008.0 | 5.6 |
| 3 | 3.1 | 0.95 (133.0) | [6] 1.2 | 3.7 | | 7,012.9 | 6.5 |
| 4 | 3.1 | 0.95 (133.0) | [6] 1.3 | 4.0 | 400 | 7,018.2 | 7.3 |
| 5 | 3.1 | 0.95 (133.0) | [6] 2.4 | 7.5 | | 7,028.1 | 8.8 |
| 6 | 3.1 | 0.95 (133.0) | [6] 2.9 | 9.1 | 405 | 7,040.1 | 10.6 |
| 7 | 3.1 | 0.90 (126.0) | [6] 3.4 | 10.9 | | 7,054.4 | 13.3 |
| 8 | 3.1 | 0.91 (127.4) | [6] 4.7 | 15.0 | 340 | 7,074.1 | 16.1 |
| Total | | | 17.8 | [7] 56.3 | | | |

[1] Determination made at the end of each hour.
[2] Feed additions are made at the beginning of each hour.
[3] The feedstock acetic acid contains 0.533 g. acetic acid/ml.
[4] Conditions at start: 4.7 g. of seed yeast; 7-L of nutrient medium; 4.62 g. of $(NH_4)_2SO_4$; and 56.0 ml. (29.8 g.) of feedstock acetic acid (0.4% acetic acid or 400 µl. acetic acid/100 ml.).
[5] As $(NH_4)_2SO_4$ solution containing 49.00 mg. N/ml.
[6] As $NH_4OH$ solution containing 52.50 g. N/ml.
[7] 30.0 g.

It will be noted from the data in Table V that the total yeast in the brew increased from 4.7 to 16.1 grams, an increase of 11.4 grams (70.8 percent yield/8 hrs.) and that propagation was initiated without noticeable lag.

TABLE IV.—SUMMARY OF EXAMPLE IV

| | pH [1] | Formalin No. (mg. N/l.) [1] | Nitrogen source additions, ml. [2] | Acetic acid feedstock additions, ml. [2] [3] | Acetic acid conc. level found, µl./100 ml. [1] | Volume, ml. | Total yeast (dry) in brew, g. |
|---|---|---|---|---|---|---|---|
| Time, hrs.: | | | | | | | |
| 0 [4] | 3.2 | 0.93 (130.2) | 0.0 | 0.0 | 410 | 7,000.0 | 4.7 |
| 1 | 3.2 | 0.93 (130.2) | [5] 0.9 | 2.9 | | 7,003.8 | 5.2 |
| 2 | 3.2 | 0.94 (131.6) | [6] 1.0 | 3.2 | 295 | 7,008.0 | 5.7 |
| 3 | 3.2 | 0.92 (128.8) | [6] 1.2 | 3.7 | | 7,012.9 | 6.6 |
| 4 | 3.2 | 0.91 (127.4) | [6] 1.3 | 4.0 | 295 | 7,018.2 | 7.5 |
| 5 | 3.2 | 0.90 (126.0) | [6] 2.4 | 7.5 | | 7,028.1 | 9.0 |
| 6 | 3.1 | 0.87 (121.8) | [6] 2.9 | 9.1 | 305 | 7,040.1 | 11.1 |
| 7 | 3.1 | 0.88 (123.2) | [6] 4.4 | 14.1 | | 7,058.6 | 13.6 |
| 8 | 3.1 | 0.92 (128.8) | [6] 5.1 | 16.3 | 240 | 7,080.0 | 16.2 |
| Total | | | 19.2 | [7] 60.8 | | | |

[1] Determination made at the end of each hour.
[2] Feed additions are made at the beginning of each hour.
[3] The feedstock acetic acid contains 0.533 g. acetic acid/ml.
[4] Conditions at start: 4.7 g. of seed yeast; 7-L of nutrient medium; 4.62 g. of $(NH_4)_2SO_4$; and 42.0 ml. (22.4 g.) of feedstock acetic acid (0.3% acetic acid or 300 µl. acetic acid/100 ml.).
[5] As $(NH_4)_2SO_4$ solution containing 49.00 mg. N/ml.
As $NH_4OH$ solution containing 52.50 mg. N/ml.
[7] 32.4 g.

It will be noted from the data in Table IV that the total yeast in the brew increased from 4.7 to 16.2 grams, an increase of 11.5 grams (71.0 percent yield/8 hrs.) and that propagation was initiated without noticeable lag.

EXAMPLE VI

The procedure of Example I is repeated using *Pichia membranaefaciens* (CS-190-1) (ATCC 20340) as the seed yeast except that an acetic acid concentration of 0.5 percent is used. A summary of the experimental data and the results obtained in Example VI are shown in Table VI.

It will be noted from the data in Table VII that the total yeast in the brew increased from 4.6 to 14.0 grams, an increase of 9.4 grams (67.1 percent yield/8

TABLE VI.—SUMMARY OF EXAMPLE VI

| | pH [1] | Formalin No. (mg. N/l.) [1] | Nitrogen source additions, ml.[2] | Acetic acid feedstock additions, ml.[2][3] | Acetic acid conc. level found, μl./100 ml.[1] | Volume, ml. | Total yeast (dry) in brew, g. |
|---|---|---|---|---|---|---|---|
| Time, hrs.: | | | | | | | |
| 0[4] | 3.1 | 0.94 (131.6) | 0.0 | 0.0 | 515 | 7,000.0 | 4.7 |
| 1 | 3.1 | 0.95 (133.0) | [5] 0.9 | 2.9 | | 7,003.8 | 5.1 |
| 2 | 3.1 | 0.95 (133.0) | [6] 1.0 | 3.2 | 468 | 7,008.0 | 5.7 |
| 3 | 3.1 | 0.97 (135.8) | [6] 1.2 | 3.7 | | 7,012.9 | 6.2 |
| 4 | 3.1 | 0.94 (131.6) | [6] 1.3 | 4.0 | 465 | 7,018.2 | 7.2 |
| 5 | 3.1 | 0.97 (135.8) | [6] 2.4 | 7.5 | | 7,028.1 | 8.2 |
| 6 | 3.1 | 0.95 (133.0) | [6] 2.9 | 9.1 | 475 | 7,040.1 | 10.0 |
| 7 | 3.1 | 0.92 (128.8) | [6] 3.4 | 10.9 | | 7,054.4 | 12.2 |
| 8 | 3.0 | 0.84 (117.6) | [6] 4.1 | 13.1 | 395 | 7,071.6 | 15.4 |
| Total | | | 17.2 | [7] 54.4 | | | |

[1] Determination made at the end of each hour.
[2] Feed additions are made at the beginning of each hour.
[3] The feedstock acetic acid contains 0.533 g. acetic acid/ml.
[4] Conditions at start: 4.7 g. of seed yeast; 7-L of nutrient medium; 4.62 g. of (NH$_4$)$_2$SO$_4$; and 70.0 ml of feedstock acetic acid (0.5% acidic acid or 500 μl. acetic acid/100 ml.).
[5] As (NH$_4$)$_2$SO$_4$ solution containing 49.00 mg. N/ml.
[6] As NH$_4$OH solution containing 52.50 mg. N/ml.
[7] 29.0 g.

It will be noted from the data in Table VI that the total yeast in the brew increasd from 4.7 to 15.4 grams, an increase of 10.7 grams (69.5 percent yield/8 hrs.) and that propagation was initiated without noticeable lag.

hrs.) but that there was a lag in the initiation of the propagation.

EXAMPLE VII

The procedure of Example I is repeated using *Pichia membranaefaciens* (CS-190-1) (ATCC 20340) as the seed yeast except that an acetic acid concentration of 0.6 percent is used. A summary of the experimental data and the results obtained in Example VII are shown in Table VII.

EXAMPLE VIII

The procedure of Example I is repeated using *Pichia membranaefaciens* (CS-190-1) (ATCC 20340) as the seed yeast except that an acetic acid concentration of 0.8 percent is used. A summary of the experimental data and the results obtained in Example VIII are shown in Table VIII.

TABLE VII.—SUMMARY OF EXAMPLE VII

| | pH [1] | Formalin No. (mg. N/l.) [1] | Nitrogen source additions, ml.[2] | Acetic acid feedstock additions, ml.[2][3] | Acetic acid conc. level found, μl./100 ml.[1] | Volume, ml. | Total yeast (dry) in brew, g. |
|---|---|---|---|---|---|---|---|
| Time, hrs.: | | | | | | | |
| 0[4] | 3.0 | 0.95 (133.0) | 0.0 | 0.0 | 620 | 7,000.0 | 4.6 |
| 1 | 3.0 | 0.95 (133.0) | [5] 0.9 | 3.1 | | 7,004.0 | 4.6 |
| 2 | 3.0 | 1.04 (145.6) | [6] 1.0 | 3.4 | 695 | 7,008.4 | 4.7 |
| 3 | 3.0 | 0.97 (135.8) | 0.0 | 0.0 | | 7,008.4 | 5.5 |
| 4 | 3.0 | 0.98 (137.2) | [6] 1.5 | 5.1 | 705 | 7,015.0 | 6.3 |
| 5 | 3.0 | 1.01 (141.4) | [6] 2.0 | 6.8 | 705 | 7,023.8 | 7.2 |
| 6 | 2.9 | 0.89 (124.6) | [6] 1.0 | 3.4 | 595 | 7,028.2 | 9.2 |
| 7 | 3.0 | 0.91 (127.4) | [6] 4.0 | 13.6 | 575 | 7,045.8 | 11.4 |
| 8 | 3.0 | 0.92 (128.8) | [6] 4.5 | 15.3 | 475 | 7,065.6 | 14.0 |
| Total | | | 14.9 | [7] 50.7 | | | |

[1] Determination made at the end of each hour.
[2] Feed additions are made at the beginning of each hour.
[3] The feedstock acetic acid contains 0.536 g. acetic acid/ml.
[4] Conditions at start: 4.6 g. of seed yeast; 7-L of nutrient medium; 4.62 g. of (NH$_4$)$_2$SO$_4$; and 84.0 ml. (45.0 g.) of feedstock acetic acid (0.6% acetic acid or 600 μl. acetic acid/100 ml.).
[5] As (NH$_4$)$_2$SO$_4$ solution containing 39.14 mg. N/ml.
[6] As NH$_4$OH solution containing 53.62 mg. N/ml.
[7] 27.2g.

TABLE VIII.—SUMMARY OF EXAMPLE VIII

| | pH [1] | Formalin No. (mg. N/l.) [1] | Nitrogen source additions, ml.[2] | Acetic acid feedstock additions, ml.[2][3] | Acetic acid conc. level found, μl./100 ml.[1] | Volume, ml. | Total yeast (dry) in brew, g. |
|---|---|---|---|---|---|---|---|
| Time, hrs.: | | | | | | | |
| 0[4] | 3.0 | 0.95 (133.0) | 0.0 | 0.0 | 1,100 | 7,000.0 | 4.6 |
| 1 | 2.9 | 0.99 (138.6) | [5] 0.9 | 3.1 | 960 | 7,004.0 | 4.6 |
| 2 | 2.9 | 0.97 (135.8) | 0.0 | 0.0 | | 7,004.0 | 4.6 |
| 3 | 3.0 | 0.98 (137.2) | 0.0 | 0.0 | 896 | 7,004.0 | 4.6 |
| 4 | 3.0 | 1.02 (142.8) | 0.0 | 0.0 | 900 | 7,004.0 | 4.6 |
| 5 | 2.9 | 1.03 (144.2) | 0.0 | 0.0 | 876 | 7,004.0 | 4.6 |
| 6 | 2.9 | 1.02 (142.8) | 0.0 | 0.0 | 780 | 7,004.0 | 4.6 |
| 7 | 2.9 | 0.98 (137.2) | 0.0 | 0.0 | 930 | 7,004.0 | 4.8 |
| 8 | 2.9 | 0.90 (126.0) | 0.0 | 0.0 | 850 | 7,004.0 | 5.7 |
| Total | | | 0.9 | [6] 3.1 | | | |

[1] Determination made at the end of each hour.
[2] Feed additions are made at the beginning of each hour.
[3] The feedstock acetic acid contains 0.536 g. acetic acid/ml.
[4] Conditions at start: 4.6 g. of seed yeast; 7-L of nutrient medium; 4.62 g. of (NH$_4$)$_2$SO$_4$; and 112.0 ml. (60.0 g.) of feedstock acetic acid (0.8% acetic acid or 800 μl. acetic acid/100 ml.).
[5] As (NH$_4$)$_2$SO$_4$ solution containing 49.14 mg. N/ml.
[6] 1.7 g.

It will be noted from the data in Table VIII that the total yeast in the brew increased very little, i.e., 4.6 to 5.7 grams, an increase of only 1.1 grams (19.3 percent yield/8 hrs.) and that propagation of the yeast was not initiated until during the 7th and 8th hours.

EXAMPLE IX

The procedure of Example I is repeated using *Pichia membranaefaciens* (CS-190-1) (ATCC 20340) as the seed yeast except that an acetic acid concentration of 1.0 percent is used. A summary of the experimental data and the results obtained in Example IX are shown in Table IX.

TABLE IX.—SUMMARY OF EXAMPLE IX

| Time, hrs.: | pH[1] | Formalin No. (mg. N/l.)[1] | Nitrogen source additions, ml.[2] | Acetic acid feedstock additions, ml.[2][3] | Acetic acid conc. level found, μl./100 ml.[1] | Volume, ml. | Total yeast (dry) in brew, g. |
|---|---|---|---|---|---|---|---|
| 0[4] | 2.9 | 0.95 (133.0) | 0.0 | 0.0 | 1,180 | 7,000.0 | 4.6 |
| 1 | 2.9 | 0.99 (138.6) | [5]0.9 | 3.1 |  | 7,004.0 | 4.6 |
| 2 | 2.9 | 0.97 (135.8) | 0.0 | 0.0 | 1,190 | 7,004.0 | 4.6 |
| 3 | 2.9 | 1.00 (140.0) | 0.0 | 0.0 |  | 7,004.0 | 4.6 |
| 4 | 2.9 | 1.02 (142.8) | 0.0 | 0.0 | 1,144 | 7,004.0 | 4.6 |
| 5 | 2.9 | 1.03 (144.2) | 0.0 | 0.0 | 1,140 | 7,004.0 | 4.6 |
| 6 | 2.9 | 1.03 (144.2) | 0.0 | 0.0 | 1,070 | 7,004.0 | 4.6 |
| 7 | 2.9 | 1.05 (147.0) | 0.0 | 0.0 | 1,210 | 7,004.0 | 4.6 |
| 8 | 2.9 | 1.07 (149.8) | 0.0 | 0.0 | 1,170 | 7,004.0 | 4.6 |
| Total |  |  | 0.9 | [6]3.1 |  |  |  |

[1] Determination made at the end of each hour.
[2] The feedstock acetic acid contains 0.536 g. acetic acid/ml.
[3] Feed additions are made at the beginning of each hour.
[4] Conditions at start: 4.6 g. of seed yeast; 7-L of nutrient medium; 4.62 g. of $(NH_4)_2SO_4$; and 140.0 ml. (75.0 g.) of feedstock acetic acid (1.0% acetic acid or 1,000 μl. acetic acid/100 ml.).
[5] As $(NH_4)_2SO_4$ solution containing 49.14 mg. N/ml.
[6] 1.7 g.

It will be noted from the data in Table IX that the growth of yeast was completely inhibited, there being no more yeast at the end of eight hours than there was at the beginning of the fermentation.

In order to present for ready comparison the affect of utilizing from 0.05 to 1.0 percent of acetic acid in the substrate as a carbon source in cultivating *Pichia membranaefaciens* (CS-190-1) (ATCC 20340), the results obtained in Examples I to IX are summarized in Table X.

TABLE X

| Example number | I | II | III | IV | V | VI | VII | VIII | IX |
|---|---|---|---|---|---|---|---|---|---|
| Acetic acid, percent | 0.05 | 0.1 | 0.2 | 0.3 | 0.4 | 0.5 | 0.6 | 0.8 | 1.0 |
| In medium initially, g | 3.7 | 7.5 | 14.9 | 22.4 | 29.8 | 37.3 | 45.0 | 60.0 | 75.0 |
| Added, g | 29.0 | 30.7 | 31.7 | 32.4 | 30.0 | 29.0 | 27.2 | 1.7 | 1.7 |
| Total in medium, g | 32.7 | 38.2 | 46.6 | 54.8 | 59.8 | 66.3 | 72.2 | 61.7 | 76.7 |
| Unused,[1] g | 3.4 | 3.8 | 9.2 | 15.6 | 20.5 | 25.2 | 32.6 | 47.1 | 69.5 |
| Used, g | 29.3 | 34.4 | 37.4 | 39.2 | 39.3 | 41.1 | 39.6 | 14.6 | 7.2 |
| Yeast (dry): |  |  |  |  |  |  |  |  |  |
| Seed, g | 4.7 | 4.7 | 4.7 | 4.7 | 4.7 | 4.7 | 4.6 | 4.6 | 4.6 |
| Net yield, g | 10.8 | 12.2 | 11.5 | 11.5 | 11.4 | 10.7 | 0.4 | 1.1 | 0 |
| Gross yield, g | 15.5 | 16.9 | 16.2 | 16.2 | 16.1 | 15.4 | 14.0 | 5.7 | 4.6 |
| 8-hour yield, percent | 69.7 | 72.2 | 71.0 | 71.0 | 70.8 | 69.5 | 67.1 | 19.3 | 0 |
| Grams of yeast grown per gram of acetic acid used | 0.37 | 0.35 | 0.31 | 0.29 | 0.29 | 0.26 | 0.24 | 0.08 | 0 |
| Lag in propagation | No | No | No | No | No | No | Yes | Yes | Yes |

[1] Determined by steam distillation.

It will be noted from the comparative data in Table X that good yields of yeast were obtained with acetic acid concentrations of 0.05 to 0.6 percent. However, when the substrate contained more than 0.5 percent of acetic acid there was a noticeable lag in the propagation. for this reason, the range of acetic acid concentration when using *Pichia membranaefaciens* (CS-190-1) (ATCC 20340) preferably does not exceed 0.5 percent. Optimum results were obtained with an acid concentration of about 0.1 to about 0.4 percent.

EXAMPLES X TO XV

The procedure of Example I is repeated except that *Pichia membranaefaciens* (ATCC 20101) is used as the seed yeast instead of *Pichia membranaefaciens* (CS-190-1) (ATCC 20340). The substrate in these examples contained 0.05, 0.2, 0.4, 0.6, 0.8 and 1.0 percent of acetic acid. The results obtained in these examples are summarized in Table XI.

TABLE XI

| Example Number | X | XI | XII | XIII | XIV | XV |
|---|---|---|---|---|---|---|
| Acetic acid, percent | 0.05 | 0.2 | 0.4 | 0.6 | 0.8 | 1.0 |
| In medium initially, g | 3.8 | 15.0 | 30.0 | 45.0 | 60.0 | 75.0 |
| Added, g | 32.1 | 35.1 | 19.6 | 1.7 | 1.7 | 1.7 |
| Total in medium, g | 35.9 | 50.1 | 49.6 | 46.7 | 61.7 | 76.7 |
| Unused,[1] g | 3.4 | 26.9 | 35.8 | 45.9 | 63.6 | 76.3 |
| Used, g | 32.5 | 23.2 | 13.8 | 0.8 |  | 0.4 |
| Yeast (dry): |  |  |  |  |  |  |
| Seed, g | 3.9 | 3.9 | 3.9 | 3.9 | 3.9 | 3.9 |
| Net yield, g | 12.2 | 12.7 | 7.0 | 0.1 | 0 | 0 |
| Gross yield, g | 16.1 | 16.6 | 10.9 | 4.0 | 3.9 | 3.9 |
| 8-hour yield, percent | 75.8 | 76.5 | 64.2 | 2.5 | 0 | 0 |
| Grams of yeast grown per gram of acetic acid used | 0.38 | 0.55 | 0.51 | 0.13 | 0 | 0 |
| Lag in propagation | No | No | Yes | Yes | Yes | Yes |

[1] Determined by steam distillation.

It will be noted from the comparative data in Table XI that good yields of yeast were obtained with acetic acid concentrations below 0.6 percent. However, when the substrate contained from 0.4 to 1.0 percent of acetic acid there was a noticeable lag in the propagation. For this reason, the range of acetic acid concentration when using *Pichia membranaefaciens* (ATCC 20101) preferably does not exceed 0.3 percent. Optimum results were obtained with an acetic acid concentration of about 0.05 to about 0.2 percent.

When the process of the invention is operated in a continuous manner, a fraction containing the desired yeast product is continuously removed from the fermentation mass. The desired yeast product is then separated from the withdrawn fraction by conventional means such as by centrifuging. Thereafter, the yeast is washed one to three times with tap water and finally dried under conditions sufficiently mild to avoid autolysis but under conditions sufficiently severe to assure recovery of a nonviable yeast product containing not more than about 10 percent moisture, usually about 3 to about 5 percent moisture. The drying temperature to insure the recovery of nonviable cells in an oven is within the range of about 50° to about 75° C. If spray drying is employed, the temperature of the dryer may be in the order of about 65° C. without adversely affecting the quality of the yeast. In drum drying, a higher drying temperature of about 120° C. can be employed.

The make-up of Pichia membranaefaciens (CS-190-

1) (ATCC 20340) and (ATCC 20101) obtained in the process of the present invention may vary slightly from one fermentaion to another. A typical chemical composition of the dried product is as follows:

|  | Pichia membranaefaciens Percent by Weight | |
|---|---|---|
|  | ATCC 20340[a] | ATCC 20101[b] |
| Total nitrogen | 7.49 | 7.92 |
| Crude protein | 46.81 | 49.50 |
| Total Amino acids | 36.80 | 40.62 |

[a] Grown on a reserve acetic acid concentration of 0.1%
[b] Grown on a reserve acetic acid concentration of 0.2%

A summary of the amino acid profile for typical Pichia membranaefaciens ATCC 20340 and ATCC 20101 grown on reserve acetic acid concentrations of 0.1 and 0.2 percent, respectively, are as follows:

| Amino Acids | Pichia membranaefaciens, Percent by weight of Dried Yeast Product | |
|---|---|---|
|  | ATCC 20340[a] | ATCC 20101[b] |
| Lysine | 2.88 | 3.25 |
| Histidine | 0.93 | 0.95 |
| Arginine | 3.34 | 3.36 |
| Threonine | 2.11 | 2.22 |
| Valine | 2.22 | 2.82 |
| Methionine | 0.66 | 0.69 |
| Isoleucine | 1.91 | 2.17 |
| Leucine | 2.99 | 3.53 |
| Phenylalanine | 1.74 | 2.15 |
| Tryptophan | 0.87 | 0.73 |
| Aspartic Acid | 3.59 | 4.00 |
| Serine | 1.76 | 2.16 |
| Glutamic Acid | 4.54 | 4.38 |
| Proline | 1.13 | 1.40 |
| Glycine | 1.75 | 2.16 |
| Alanine | 2.31 | 2.93 |
| Tyrosine | 1.65 | 1.32 |
| Cystine | 0.45 | 0.41 |

[a] Grown on a reserve acetic acid concentration of 0.1%
[b] Grown on a reserve acetic acid concentration of 0.2 %

While our invention has been described with reference to various specific examples and embodiments, it will be understood that the invention is not limited to such examples and embodiments and may be variously practiced within the scope of the claims hereinafter made.

We claim:

1. A process for cultivating an acetic acid-consuming yeast which comprises introducing an acetic acid-consuming yeast at an active fermentation temperature of about 20° to about 35° C. into a yeast growth-supporting mixture comprising an aqueous nutrient medium, acetic acid, a nitrogen source material and a gas containing free oxygen, said mixture initially containing about 0.05 to about 0.5 volume percent of acetic acid and about 30 to about 200 mg. of nitrogen per liter of fermentation mass and about 0.2 to about 3 grams of yeast per liter of fermentation mass and cultivating the acetic acid-consuming yeast in said mixture while incrementally introducing into said mixture additional acetic acid and nitrogen source material throughout the growth period of the yeast, the amount of the acetic acid and the nitrogen source material introduced at any given time being such that the total amount of acid present in said mixture at said time is about 0.05 to about 0.5 percent by volume and the total amount of nitrogen present in said mixture at said time is about 30 to about 200 mg. of nitrogen per liter of fermentation mass.

2. The process of claim 1 wherein the yeast is of the family Saccharomycetaceae.

3. The process of claim 2 wherein the yeast is of the subfamily Saccharomycetoideae.

4. The process of claim 3 wherein the yeast is of the genus Pichia.

5. The process of claim 4 wherein the yeast is of the species Pichia membranaefaciens.

6. The process of claim 4 wherein the yeast is of the strain Pichia membranaefaciens, (ATCC 20340).

7. The process of claim 5 wherein the pH of the aqueous nutrient medium is within the range of about 2 to about 5.

8. The process of claim 1 wherein the oxygen-containing gas is air.

9. A process for cultivating an acetic acid-consuming yeast of the genus *Pichia* which comprises introducing the yeast at a temperature of about 25° to about 35° C. into a yeast growth-supporting mixture comprising an aqueous nutrient medium whose pH is maintained within the range of about 2 to about 5, acetic acid, a nitrogen source material and air, said mixture initially containing about 0.05 to about 0.5 percent by volume of acetic acid, about 30 to about 200 mg. of nitrogen per liter of fermentation mass and about 0.2 to about 3 grams of yeast per liter of fermentation mass and cultivating the yeast in said mixture while incrementally introducing into said mixture additional acetic acid and nitrogen source material througout the growth period of the yeast, the amount of the acetic acid and the nitrogen source material introduced at any given time being such that the total amount of acetic acid present in said mixture at said time is about 0.05 to about 0.5 percent by volume and the total amount of nitrogen present in said mixture at said time is about 30 to about 200 mg of nitrogen per liter of fermentation mass.

10. The process of claim 9 wherein the yeast is of the species *Pichia membranaefaciens*.

11. A process for cultivating an acetic acid-consuming yeast of the genus *Pichia* which comprises introducing the yeast at a temperature of about 25° to about 35° C. into a yeast growth-supporting mixture comprising an aqueous nutrient medium whose pH is maintained within the range of about 2 to about 5, acetic acid, a nitrogen source material and air, said mixture initially containing about 0.05 to about 0.3 percent by volume of acetic acid, about 30 to about 200 mg of nitrogen per liter of fermentation mass and about 0.2 to about 3 grams of yeast per liter of fermentation mass; cultivating the yeast in said mixture while incrementally introducing into said mixture additional acetic acid and nitrogen source material throughout the growth period of the yeast, the amount of the acetic acid and the nitrogen source material introduced at any given time being such that the total amount of acetic acid present in said mixture at said time is about 0.05 to about 0.3 percent by volume and the total amount of nitrogen present in said mixture at said time is about 30 to about 200 mg of nitrogen per liter of fermentation mass; separating a yeast fraction from the fermentation mass; and recovering yeast from said fraction.

12. The process of claim 11 wherein the yeast is of the species Pichia membranaefaciens.

13. The process of claim 11 wherein the yeast is of the strain Pichia membranaefaciens, (ATCC 20340).

14. The process of claim 11 wherein the yeast is of the strain Pichia membranaefaciens (ATCC 20101).

* * * * *

UNITED STATES PATENT OFFICE
CERTIFICATE OF CORRECTION

Patent No. 3,775,252          Dated November 27, 1973

Inventor(s) Norma A. Kinsel and William W. Leathen

It is certified that error appears in the above-identified patent and that said Letters Patent are hereby corrected as shown below:

Column 1, line 56, "acetoglutanicum" should read
-- acetoglutamicum --.

Column 3, line 35, "apprxoimately" should read
-- approximately --.

Column 5, line 39, after "create" and before "vortex" insert
-- a --.

Column 10, Table III,

| Total Yeast (Dry) in Brew, g. | | Total Yeast (Dry) in Brew, g. |
|---|---|---|
| 4.7 | should read | 4.7 |
| 5.2 | | 5.2 |
| 5.8 | | 5.8 |
| 5.6 | | 6.5 |

Table III, Footnote 1 should read -- Determination made at the end of each hour --;

Table III, Footnote 3 should read -- The feedstock acetic acid contains 0.533 g. acetic acid/ml --.

Column 11, Table IV, in the footnote insert -- 6 -- before "As $NH_4OH$".

UNITED STATES PATENT OFFICE
CERTIFICATE OF CORRECTION

Patent No. 3,775,252          Dated November 27, 1973

Inventor(s) Norma A. Kinsel and William W. Leathen

It is certified that error appears in the above-identified patent and that said Letters Patent are hereby corrected as shown below:

PAGE 2

Column 13, Table VI, Footnote 4, after "70.0 ml" and before "of" insert -- (37.3 g.) --.

Column 13, Table VII, Footnote 5, "39.14 mg." should read -- 49.14 mg. --.

Column 15, line 56 "for" should read -- For --.

Column 18, line 9, "The process of claim 5" should read -- The process of claim 1 --;

line 27, "througout" should read -- throughout --.

Signed and sealed this 23rd day of July 1974.

(SEAL)
Attest:

McCOY M. GIBSON, JR.
Attesting Officer

C. MARSHALL DANN
Commissioner of Patents